United States Patent

Plowdrey et al.

[11] Patent Number: 5,742,897
[45] Date of Patent: Apr. 21, 1998

[54] MATCHING TRANSFORMER FOR DUAL-BAND RADIO RECEIVER

[75] Inventors: Robert Donald Plowdrey, Dearborn; Robert Carl Beier, Chesterfield, both of Mich.; Yao Hsien Kuo, Brentwood, England

[73] Assignee: Ford Global Technologies, Inc., Dearborn, Mich.

[21] Appl. No.: 554,335

[22] Filed: Nov. 6, 1995

[51] Int. Cl.⁶ .................................................. H04B 1/18
[52] U.S. Cl. ........................ 455/142; 455/292; 370/297
[58] Field of Search .......................... 455/142, 180.1, 455/188.1, 190.1, 292, 338, 189.1, 179.1, 132, 133; 370/297, 339

[56] References Cited

U.S. PATENT DOCUMENTS

| | | |
|---|---|---|
| 2,159,944 | 5/1939 | Roberts . |
| 2,236,982 | 4/1941 | Worcester, Jr. . |
| 3,497,811 | 2/1970 | Karpowycz et al. . |
| 3,747,026 | 7/1973 | Covill .................................. 333/6 |
| 3,987,448 | 10/1976 | Scheppman .................. 455/142 |
| 4,051,475 | 9/1977 | Campbell ..................... 370/297 |
| 4,228,544 | 10/1980 | Guyton ....................... 455/292 |
| 4,556,856 | 12/1985 | Presser ...................... 333/124 |

*Primary Examiner*—Reinhard J. Eisenzopf
*Assistant Examiner*—Sam Bhattacharya
*Attorney, Agent, or Firm*—Mark Mollon

[57] ABSTRACT

A dual-band radio receiver utilizes a single transformer to provide impedance matching between signal mixers from separate signal paths to their respective intermediate frequency filters. Thus, a dual-band radio receiver can be made eliminating one transformer and the printed circuit board space of one transformer. In addition, only one transformer needs to be frequency aligned or adjusted during manufacturing.

7 Claims, 2 Drawing Sheets mediate frequency substantially equal to the first intermediate frequency. A resonant circuit including a single transformer receives both of the first and second IF signals and includes a primary winding coupled to the first and second mixers and a transformer secondary circuit inductively coupled to the primary winding. A first IF filter is coupled to the secondary circuit and is adapted to filter the first IF signal when the receiver is receiving in the first broadcast band. A second IF filter is coupled to the secondary circuit and is adapted to filter the second IF signal when the receiver is receiving in the second broadcast band. An isolation circuit is coupled between the first IF filter and the second IF filter.

MATCHING TRANSFORMER FOR DUAL-BAND RADIO RECEIVER

BACKGROUND OF THE INVENTION

The present invention relates in general to providing a matching impedance between the output of a mixer and the input of an intermediate frequency filter in a broadcast radio receiver, and more specifically to using a single transformer to impedance match both intermediate frequency filters with their respective mixers in a dual-band radio receiver.

The majority of radio receivers operate using heterodyne reception, wherein a received high-frequency broadcast radio wave is shifted in frequency to a standard frequency for filtering and further processing. For example, in a superheterodyne receiver, incoming radio-frequency (RF) signals from an antenna are fed into a mixer for conversion to an intermediate frequency (IF) signal with a fixed center frequency. IF signals are filtered and amplified before being fed into a detector for demodulation.

In a dual-band radio receiver, such as an AM/FM receiver, separate processing components must be maintained for each separate broadcast band being received. In one typical type of AM and FM receiver, the AM signal path uses double-conversion wherein the first AM IF frequency is the same as the FM IF frequency. However, even though identical center frequencies are used for IF signals in a portion of both signal paths, separate AM and FM signal processing is still required since AM and FM signals are incompatible. Specifically, AM and FM broadcast standards utilize different bandwidths and different types of modulation. Furthermore, AM and FM signal paths are usually specially-separated on a printed circuit board, and integration of parts has not been sought. As dual AM/FM integrated circuits are introduced, parts integration becomes more desirable.

The interconnection within each signal path of the receiver between active and passive devices requires the use of impedance matching to obtain maximum power transfer between consecutive, elements in the signal path. For example, a transformer may be inserted between different devices for matching purposes. Such a transformer is typically utilized between the mixer and the subsequent IF filter in a superheterodyning receiver.

In a dual-band receiver, twice as many matching transformers may be required, resulting in added expense both from the number of transformers needed and the circuit board area required to accommodate the transformers. In addition, each separate transformer must, be adjusted (i.e., frequency aligned) during manufacture of the receiver. Therefore, it would be desirable to reduce the number of matching transformers required.

SUMMARY OF THE INVENTION

The present invention has the advantage of eliminating a matching transformer in a dual-band radio receiver by achieving impedance matching in both signal paths with a single transformer. An AM/FM tuner can thus be achieved with a smaller circuit board having a reduced number of components and less adjustment during manufacture.

Specifically, the present invention provides a dual-band radio receiver with a first RF signal section outputting a first RE signal in a first broadcast band. A first mixer is coupled to the first RF signal section outputting a first IF signal having a first intermediate frequency. A second RF signal section outputs a second RF signal in a second broadcast band. A second mixer is coupled to the second RF signal section and outputs a second IF signal having a second intermediate frequency substantially equal to the first intermediate frequency. A resonant circuit including a single transformer receives both of the first and second IF signals and includes a primary winding coupled to the first and second mixers and a transformer secondary circuit inductively coupled to the primary winding. A first IF filter is coupled to the secondary circuit and is adapted to filter the first IF signal when the receiver is receiving in the first broadcast band. A second IF filter is coupled to the secondary circuit and is adapted to filter the second IF signal when the receiver is receiving in the second broadcast band. An isolation circuit is coupled between the first IF filter and the second IF filter.

DETAILED DESCRIPTION OF PREFERRED EMBODIMENTS

Figure 1:
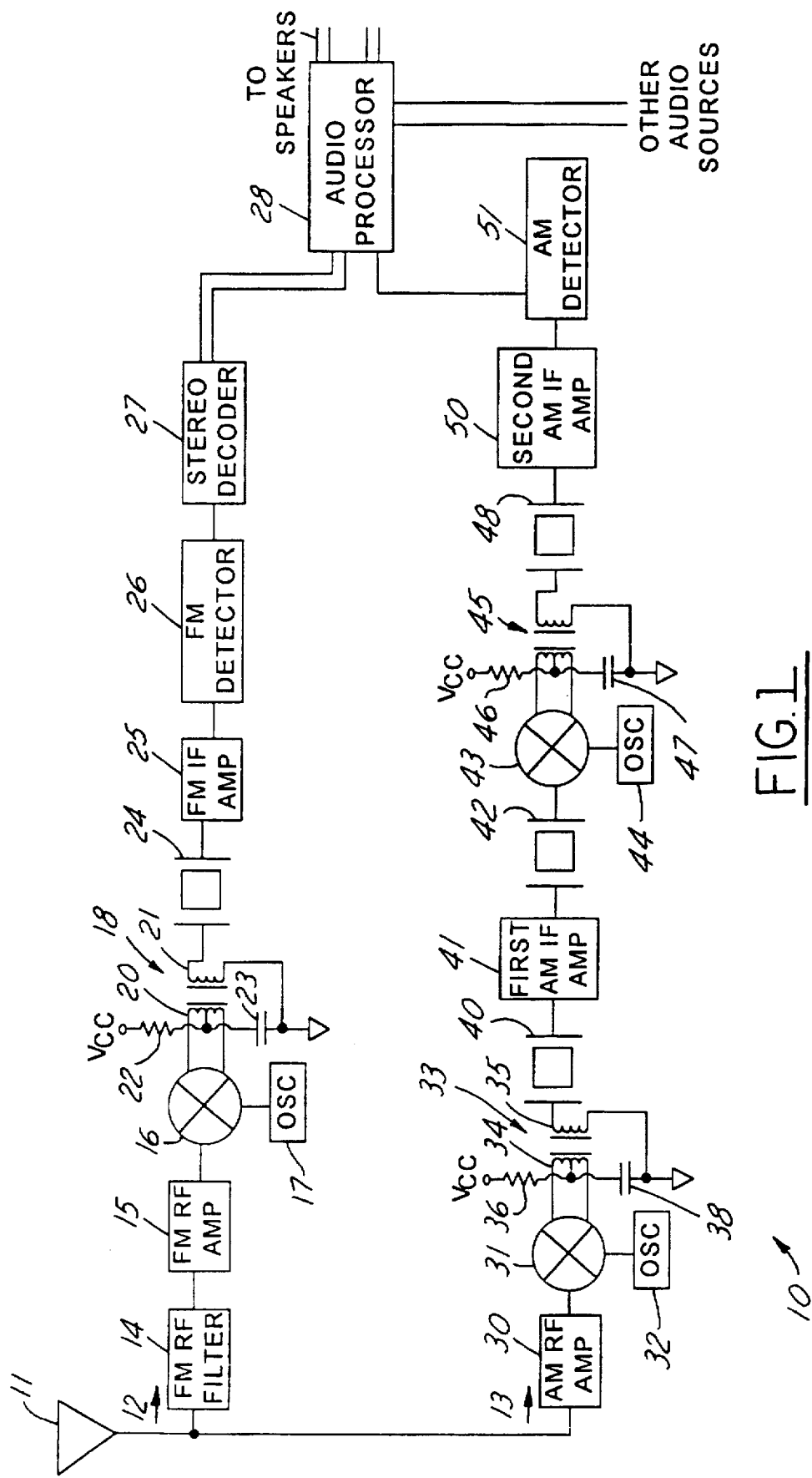
FIG. 1 is a block diagram showing a simplified prior art dual-band radio receiver.

A simplified block diagram of a dual-band AM/FM radio receiver 10 is shown in FIG. 1. An antenna 11 is connected to an FM signal path 12 and an AM signal path 13. FM signal path 12 includes an FM RF filter 14 connected to an FM RF amplifier 15. A frequency-selected and amplified signal is coupled from FM RF amplifier 15 to one input era mixer 16. The other input of mixer 16 receives a local oscillator signal from an oscillator 17 having a frequency selected to produce a frequency translation to the intermediate frequency of the FM signal path. The IF signal from mixer 16 passes through a matching transformer 18 to a ceramic filter 24. Transformer 18 includes a primary winding 20 and a secondary winding 21 having a coupling coefficient adapted to provide transformation between the impedance of the mixer and the filter. Mixer bias is provided through a resistor 22 connected to a supply voltage $V_{CC}$ and to a center tap of primary winding 20. A capacitor 23 is connected between the center tap and ground to provide power supply filtering. Capacitor 23 has a capacitance that provides an AC short circuit for the IF signal.

The filtered IF signal from ceramic filter 24 is amplified in an FM IF amplifier 25. An FM detector 26 demodulates the IF signal and then stereo audio is recovered in stereo decoder 27, as is known in the art. Stereo signals are provided to an audio processor 28 for providing volume, tone, and balance controls to a plurality of speaker outputs.

In the AM signal path 13 of receiver 10, double conversion is employed with a first relatively high IF frequency and a lower second IF frequency. A second, lower IF frequency is necessary to provide a sufficiently narrow bandpass filtering of the AM signal.

In FIG. 1, an AM RF amplifier 30 amplifies antenna signals from the antenna in the AM broadcast band and provides an RF signal to one input of a mixer 31. Another mixer input receives a local oscillator signal from an oscillator 32 with a frequency that is varied by a phase-locked loop control (not shown) in order to place a desired AM broadcast signal into the selected intermediate frequency transformer 33 has a primary winding 34 and a secondary winding 35 with n coupling coefficient adapted to transform the impedance from the output of mixer 31 to the input of an AM crystal filter 40. Mixer bias and power supply filtering are provided by resistor 36 and capacitor 38 connected to a center tap of primary winding 34. Filter 40 provides an IF signal to a first AM IF amplifier 41. The amplified IF signal is passed through another ceramic filter 42 and is converted to a second (lower) IF frequency by a second AM mixer 43 and an oscillator 44. A second AM IF signal is magnetically coupled through a transformer 45 to another ceramic filter 48. Transformer 45 matches impedances of the second mixer output and filter 48 and provides additional bandpass filtering. Bias voltage for mixer 43 is provided via a the center-tapped primary winding of transformer 45 connected to resistor 46 and capacitor 47.

The second filtered AM IF signal from filter 48 is amplified in a second AM amplifier 50 and then is detected in AM detector 51. The demodulated AM output is provided to a respective input of audio processor 28. Audio processor 28 includes further inputs for other audio sources, such as a cassette tape or a compact disc player.

As is apparent from FIG. 1, the prior art receiver uses a second impedance matching transformer between the mixers and filters in each respective signal path. Besides the cost of each individual transformer, the need for a plurality of transformers consumes additional circuit board space and requires additional adjustments during manufacture of the receiver; thereby raising the cost of the receiver.

The frequency of the IF signal in each signal path is selected to provide good image rejection, good gain, stability and narrow bandwidth. An FM IF is typically designed to be at 10.7 MHz, while a typical AM IF center frequency is designed at 450 kHz. In the double-conversion receiver, two heterodyning operations at one high and one low intermediate frequency are used in a single signal path. The higher frequency IF section provides good image rejection while the lower frequency IF section provides improved selectivity and gain. The AM signal path especially benefits from the use of double conversion.

In order to take advantage of standard tuner components, most if not all IF frequencies used in the two signal paths may preferably equal the standard values of 450 kHz and 10.7 MHz. Often times, different sections of the two separate signal paths will operate at substantially identical intermediate frequencies. Thus, in FIG. 1, the first AM IF signal from mixer 31 has an IF frequency equal to the IF frequency of the FM IF signal from mixer 16 (e.g., 10.7 MHz).

Figure 2:
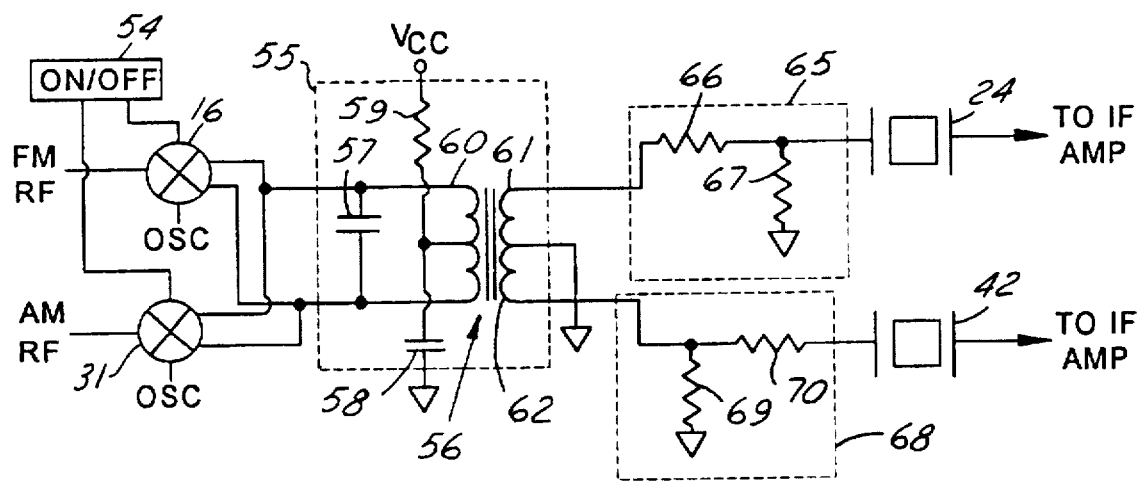
FIG. 2 is a schematic diagram illustrating the shared matching transformer of the present invention.

FIG. 2 shows a schematic diagram of the present invention wherein a single transformer is utilized to provide impedance matching in two separate signal paths in a dual-band radio receiver. A resonant circuit 55 includes a transformer 56 having a primary winding 60 and a pair of secondary windings 61 and 62. A capacitor 57 is connected across primary winding 60. A capacitor 58 is connected between ground and a center tap of primary winding 60. The center tap is also coupled to supply voltage $V_{cc}$ through a resistor 59. Resonant circuit 55 provides additional filtering of the IF signal, especially at frequencies far away from the IF frequency (e.g., 10.7 MHz). Due to the filtering of resonant circuit 55, the IF frequency of the two signal paths must be substantially equal so that both fall within the passband of the circuit.

Primary winding 60 is parallel connected with the outputs of FM mixer 16 and AM mixer 31 which provide respective IF signals having substantially identical intermediate frequencies (e.g., about 10.7 MHz). An ON/OFF control 54 is connected to both mixers 16 and 31 in order to switch off the mixer corresponding to the broadcast band not being received. This reduces impedance loading effects on the active mixer.

The junction of secondary windings 61 and 62 is connected to ground. The other end of secondary winding 61 is coupled to the input of ceramic filter 24 through an impedance matching and FM isolation network 65. Network 65 includes series resistor 66 and a pull down resistor 65. Network 65 isolates the reflecting impedance of ceramic filter 24 in addition to improving impedance matching of the transformer and ceramic filter. Ceramic filter 24 has a typical input impedance of about 330 ohms. Resistor 66 may have a resistance of about 47 ohms and resistor 67 a resistance of about 330 ohms, for example.

The other end of secondary winding 62 is coupled to the input of AM crystal filter 42 through an impedance matching and AM isolation network 68. Network 68 includes a pull clown resistor 69 and a series resistor 70. Crystal filter 42 may have a typical input impedance of about 1.5 k ohms. Resistor 69 may have a resistance of about 1.5 k ohms and resistor 70 a resistance of about 1 k ohms, for example. The inputs of filters 24 and 42 are thus isolated to prevent signal reflection from the filter in the currently inactive signal path into the active signal path.

The coupling coefficients between primary winding 60 and secondary windings 61 and 62 are selected to provide the necessary impedance matching between the respective mixers and filters. A closer coupling of secondary coil 62 corresponding to the AM signal path is typically needed since the input impedance of an AM crystal filter is higher than the input impedance of an FM ceramic filter. For example, a coupling coefficient of about 0.48 between primary winding 60 and secondary winding 62 and a coupling coefficient of about 0.4 between primary winding 60 and secondary 61 have been employed.

The circuit of FIG. 2 provides impedance matching for two reception signal paths using only one transformer, thereby reducing parts count, printed circuit board space, and component adjustment during manufacture. In addition, mixer bias to two mixers is provided using only one resistor-capacitor combination, thereby further reducing parts count and board space.

Figure 3:
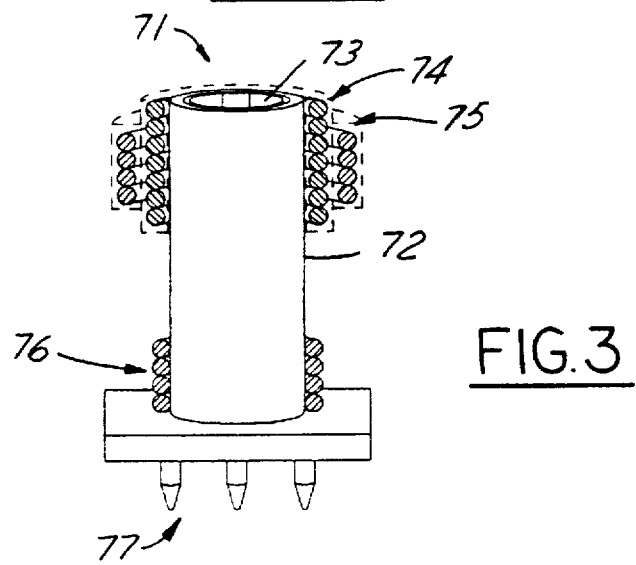
FIG. 3 is a side view showing construction of a transformer of the present invention.

FIG. 3 shows a slug-tuned transformer 71 that is useful in the preferred embodiment. A support sleeve 72 receives an adjustable ferrite core slug 73 for adjusting transformer inductances. A primary winding 74 is wound on one portion of support sleeve 72. A secondary winding 75 is wound directly over primary winding 74 to provide a close coupling coefficient. Another secondary winding 76 is wound on another portion of support sleeve 72 to provide a somewhat lower coupling coefficient. A plurality of leads 77 are provided to interconnect each winding with a circuit board.

Figure 4:
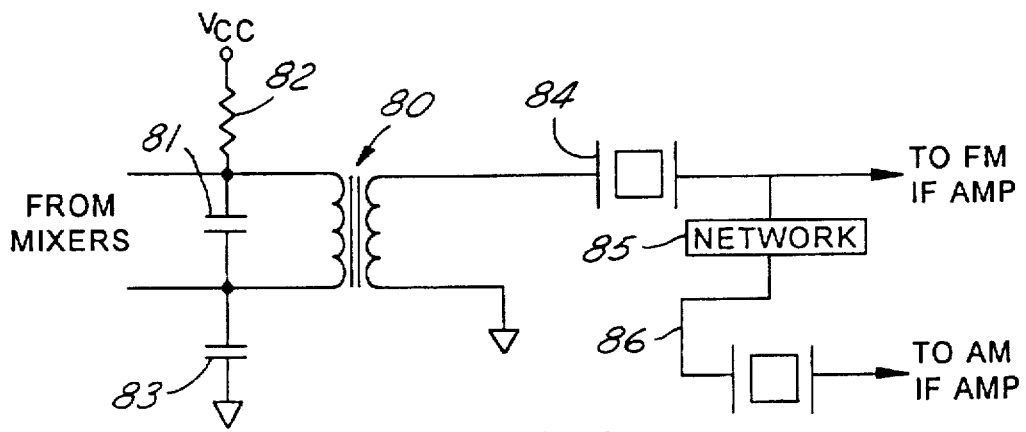
FIG. 4 is a schematic diagram showing an alternative embodiment of the present invention.

FIG. 4 shows and alternative embodiment of the invention utilizing a transformer 80 with a single primary winding and a single secondary winding. A capacitor 81 connected across the primary winding completes a resonant circuit with transformer 80. Mixer bias is provided by resistor 82 and capacitor 83. The secondary winding of transformer 80 is connected to an FM ceramic filter 84 for providing a filtered IF signal to the FM IF amplifier. An impedance matching and isolation network 85 is connected between the output of ceramic filter 84 and the input of an AM crystal filter 86. A filtered IF signal is provided from crystal 86 to the AM IF amplifier. Matching network 85 matches the output impedance of ceramic filter 84 with the input impedance of crystal filter 86. In addition, network 85 prevents signal reflection from the input of crystal filter 86 to the FM IF amplifier during FM reception, similar to the previous embodiment.

The embodiment of FIG. 4 has the advantage that a single transformer secondary winding is needed and only one impedance matching and isolation network is required. Furthermore, the AM signal path has the added filtering provided by the FM ceramic filter. Since the bandwidth of the FM IF filter is greater than the bandwidth of the AM IF filter, the added filtering from the FM IF filter in the embodiment of FIG. 4 can aid or improve AM selectivity. However, in some embodiments the additional insertion loss of ceramic filter 84 into the AM signal path may be prohibitive.

What is claimed is:

1. A dual-band radio receiver comprising:

a first RF signal section outputting a first RF signal in a first broadcast band;

a first mixer coupled to said first RF signal section outputting a first IF signal having a first intermediate frequency;

a second RF signal section outputting a second RF signal in a second broadcast band;

a second mixer coupled to said second RF signal section outputting a second IF signal having a second intermediate frequency substantially equal to said first intermediate frequency;

means for activating only one of said first or second mixers at a time;

a resonant circuit including a single impedance matching transformer receiving both of said first and second IF signals, said transformer including a primary winding coupled to said first and second mixers in parallel and including a transformer secondary circuit inductively coupled to said primary winding;

a first IF filter coupled to said secondary circuit and adapted to filter said first IF signal when said receiver is receiving in said first broadcast band;

a second IF filter coupled to said secondary circuit and adapted to filter said second IF signal when said receiver is receiving in said second broadcast band; and an isolation circuit coupled between said first IF filter and said second IF filter;

whereby said single impedance matching transformer provides impedance matching between said first mixer and said first IF filter and between said second mixer and said second IF filter.

2. The receiver of claim 1 wherein said secondary circuit is comprised of first and second secondary windings, said first secondary winding being connected to said first IF filter and said second secondary winding being connected to said second IF filter.

3. The receiver of claim 1 wherein said first IF signal has a bandwidth greater than a bandwidth of said second IF signal, and wherein said second IF signal is filtered by said first and second IF filters in series when said receiver is receiving said second broadcast signal.

4. The receiver of claim 2 wherein said isolation circuit is comprised of:

a first resistor network connected between and matching impedances of said first secondary winding and said first IF filter; and a second resistor network connected between and matching impedances of said second secondary winding and said second IF filter.

5. The receiver of claim 1 wherein said transformer comprises an adjustable ferrite core.

6. The receiver of claim 1 wherein said first broadcast band is an FM band and wherein said second broadcast band is an AM band.

7. The receiver of claim 6 wherein said secondary circuit is comprised of first and second secondary windings, wherein said first secondary winding is connected with said first IF filter and said second secondary winding is connected with said second IF filter, and wherein said first secondary winding has a first coupling coefficient with said primary winding which is greater than a second coupling coefficient between said second secondary winding and said primary winding.

* * * * *